United States Patent [19]

Jamieson et al.

[11] Patent Number: 5,408,573

[45] Date of Patent: Apr. 18, 1995

[54] INTEGRATED MOTOR CONTROLLER

[75] Inventors: J. Scott Jamieson, Waukesha, Wis.;
Henry A. Gleason, III, El Paso, Tex.

[73] Assignee: Johnson Service Company, Milwaukee, Wis.

[21] Appl. No.: 899,764

[22] Filed: Jun. 17, 1992

[51] Int. Cl.⁶ ............................................. H02P 5/168
[52] U.S. Cl. .................................. 388/815; 388/907.5; 388/934; 364/505; 364/570; 364/707; 431/26
[58] Field of Search ................... 388/809–815, 388/903, 907.5, 934; 364/138, 140, 143, 161, 162, 505, 570, 707, 496; 431/6, 13, 18, 26, 90, 70, 12

[56] References Cited

U.S. PATENT DOCUMENTS

| | | |
|---|---|---|
| 4,282,574 | 8/1981 | Yoshida et al. |
| 4,365,290 | 12/1982 | Nelms et al. |
| 4,381,075 | 4/1983 | Cargill et al. ................ 237/8 R |
| 4,381,552 | 4/1983 | Nocilini et al. |
| 4,399,537 | 8/1983 | Jones . |
| 4,412,328 | 10/1983 | Homa ........................ 371/25 |
| 4,455,623 | 6/1984 | Wesemeyer et al. |
| 4,518,345 | 5/1985 | Mueller et al. |
| 4,551,841 | 11/1985 | Fujita et al. |
| 4,562,544 | 12/1985 | Bonitz et al. |
| 4,581,697 | 4/1986 | Jamieson et al. |
| 4,604,046 | 8/1986 | Mueller et al. |
| 4,612,418 | 9/1986 | Takeda et al. |
| 4,614,880 | 9/1986 | Go et al. |
| 4,639,852 | 1/1987 | Motomiya . |
| 4,683,568 | 7/1987 | Urban . |
| 4,695,246 | 9/1987 | Beilfuss et al. |
| 4,696,002 | 9/1987 | Schleupen et al. |
| 4,698,748 | 10/1987 | Juzswik et al. |
| 4,740,891 | 4/1988 | Kirkpatrick . |
| 4,747,041 | 5/1988 | Engel et al. |
| 4,759,592 | 7/1988 | Dahnert . |
| 4,842,510 | 6/1989 | Grunden et al. |
| 4,872,828 | 10/1989 | Mierzwinski et al. |
| 4,931,975 | 6/1990 | Gleason, III et al. |
| 5,051,936 | 9/1991 | Gleason, III et al. |

Primary Examiner—William M. Shoop, Jr.
Assistant Examiner—David Martin
Attorney, Agent, or Firm—Foley & Lardner

[57] ABSTRACT

A motor controller for a recreational vehicle (RV) heating system is disclosed. The motor controller regulates the amount of current supplied to an electrical motor in a blower of the heating system in response to the operating voltage and a signal from a microprocessor. The microprocessor operates a linear program in response to a cyclical signal provided at a reset terminal. The motor controller includes a locked rotor sensor which determines if the motor is turning. The motor controller utilizes a resistor as a voltage limiting means and a field effect transistor (FET) for bypassing the resistor. The microprocessor and motor controller provide a highly reliable and readily adaptable heating system which is not disadvantageously susceptible to variations in the supply voltage.

16 Claims, 5 Drawing Sheets

INTEGRATED MOTOR CONTROLLER

This application is related to U.S. Pat. No. 4,931,975, issued to Gleason et al. on Jun. 5, 1990 and U.S. Pat. No. 5,051,936, issued to Gleason et al. on Sep. 24, 1991. Both patents are assigned to the assignee of the present invention.

BACKGROUND OF INVENTION

This invention relates generally to a controller of the type suitable for use with an electrical motor. More specifically, this invention relates to a motor controller which receives at least one operating signal from a microprocessor-based system. Preferably, the microprocessor-based system includes a linear program for generating the operating signal. The program operates in synchrony with a recurring signal provided to the reset terminal of the microprocessor.

In a preferred embodiment, the invention also relates to a motor controller operatively connected to a microprocessor-based system for use in recreational vehicle ("RV") heating systems. The motor controller is described herein with reference to a combustible fuel burner system, however, the invention is not so limited. The invention is in fact applicable in any application where the control of a motor is desired.

A combustible fuel burner system such as those employed in RV heating systems generally includes an ignition system and a blower. The ignition system typically includes an output relay for energizing a gas valve, a spark generator for igniting the gas available at the gas valve, and a flame-sensing probe for detecting the presence of a flame. The ignition system generally operates to control a flame associated with the heating system.

The flame is typically located in a combustion chamber. The flame heats air in a heat exchanger. The blower forces the heated air out of the heat exchanger and into an RV living space. The blowers or fans associated with RV heating systems generally include a direct current (DC) motor. The motor in such prior art systems is generally controlled by a relay which provides DC power to the motor. Such prior art DC motors are generally powered by a full wave rectified supply created by voltage converters used at most RV parks or by a 12 volt DC battery.

An example of a microprocessor-based controller is disclosed in U.S. Pat. No. 4,581,697 entitled "Controller for Combustible Fuel Burner," issued to Jamieson et al. on Apr. 8, 1986. In U.S. Pat. No. 4,581,697, the microprocessor-based apparatus controls the operation of a combustible fuel burner. The apparatus utilizes a synchronizing signal for monitoring the integrity of certain circuit components, which may incorporate one or more input and output stages. The apparatus is adaptable to conduct control sequences in accordance with predetermined lapses of time rather than upon the occurrence of predetermined events.

A microprocessor-based control system offering a high degree of reliability and readily adaptable to a wide variety of control strategies is described and shown in U.S. Pat. No. 4,931,975 entitled "Microprocessor-Based Controller with Synchronous Reset," issued to Gleason et al. on June 25, 1990, and U.S. Pat. No. 5,051,936 entitled "Microprocessor-Based Controller with Synchronous Reset," issued to Gleason et al on Sep. 24, 1991. Such a prior art microprocessor-based system executes a linear program to provide output signals which reliably control the operation of a combustible fuel furnace. Reset signals are applied to the reset terminal of a microprocessor in the system for causing the microprocessor to enter active and inactive states. To ensure operational reliability, the microprocessor includes means for performing a plurality of data integrity checks upon entering the active state and further includes means for calculating and storing information prior to entering the inactive state.

Although the microprocessor-based control system in U.S. Pat. Nos. 4,931,975 and 5,051,936 ensures the operational reliability of the ignition system, no such system has been employed including a circuit to also reliably and accurately control the electric motor associated with the blower. Heretofore, prior art controllers in RV heating systems have not precisely controlled the speed of the motor over various operating voltages. The speed of the motor affects the amount of air moved by the fan or blower. Motor speed is affected by the amount of power supplied to the DC motor. If the voltage supplied to a DC motor is increased, generally the DC motor speed increases. Small increases in voltages generally result in large increases in speed and consequently, significant increases in the volume of air moved by the blower. In RV gas-fired heating systems, the performance of the heating operation is greatly affected by small changes in voltage.

Recent industry trends towards decreasing the size of RV heating systems require the use of small DC motors. Small DC motors are particularly susceptible to variations in motor speed due to variations in supply voltage. The variation in air flow rate due to variation in motor speed has made the design of efficient heat exchangers difficult.

The voltage received by RV heating systems varies from the virtually pure DC of a battery to the full wave rectified sign-wave voltage supplied by the voltage converters used at most RV parks. Additionally, a large variation in supply voltage occurs over the charge/discharge cycle of RV batteries. For instance, a fully charged RV battery supplies approximately 15 volts DC to the motor, and an almost fully discharged battery supplies approximately 9 volts DC. This 6 volt DC variation creates a large variation in motor speed. Thus, the large variation in supply voltage over the charge/discharge cycle of the battery creates a large variation in air flow through the heat exchanger. Also, a large variation may occur in the effective line voltage created by the voltage converters employed at the RV parks. The variation in line voltage results in a large variation in motor speed which consequently creates a large variation in air flow through the heat exchanger. Such large fluctuations in air flow result in occupant discomfort, poor heating and energy efficiency, and noise nuisances.

Heretofore, RV blowers generally employed a motor controller generally utilizing only a relay switch for starting and stopping the motor without circuitry for controlling the motor speed. Such prior art design schemes for a motor controller are susceptible to changes in supply voltages. Further, the control of the DC motor used in an RV heating system requires a highly reliable and readily adaptable motor controller. In an RV heating system and in other applications requiring a high degree of reliability, it is necessary to be able to predict or limit the possible failure modes of the system. While a high degree of reliability can be accomplished in ignition systems, heretofore this has not been done with motor controller systems. Accordingly, the integration of a full motor controller into a standard microprocessor-based ignition system is a significant advance in the art. Thus, a motor controller for use with an ignition system similar to the systems disclosed in U.S. Pat. Nos. 4,931,975 and 5,051,936 provides a highly reliable readily adaptable motor controller which is not disadvantageously susceptible to variations in the supply voltage.

SUMMARY OF THE INVENTION

The present invention relates to a motor controller coupled to a microprocessor. The controller includes a resistor coupled in series to the motor, a switch coupled in parallel to the resistor, a power sense circuit coupled to the motor which generates a control signal indicative of the power associated with the motor, and a duty cycle circuit coupled to the switch which modulates the switch in accordance with the control signal and a speed control signal from the microprocessor.

The invention also relates to an apparatus for reliably controlling a process and includes a microprocessor having input circuitry for receiving an electrical signal conveying information about the process and output circuitry for providing electrical output signals to control at least one parameter related to a motor. Means are also provided for applying activating signals to the reset terminal of the microprocessor. The activating signals have succeeding repetitive first and second levels, such that in operation the microprocessor enters an active state when the activating signal is at a first level and an inactive state when the activating signal is at a second level. While in the active state, the microprocessor preferably executes a linear program and provides output signals to a motor controller.

The invention also relates to a motor control system for controlling a motor over a range of variations in voltages supplied to the control system. The control system includes a microprocessor means for operating a linear program, a power limiting means for limiting power supply to the motor, a power regulating means for providing a relatively constant power level to the motor in response to a first control signal, and a power sense means for generating a second control signal. A first control signal generating means generates the first control signal in response to the second control signal and a processor signal.

Further, the invention relates to a method for controlling a heat exchange system which runs a linear program in response to a cyclical signal provided to a reset terminal. The heat exchange system preferably includes an ignition system and a motor controller, a motor which drives a fan, a sail switch for indicating air flow, and a thermostat. The method preferably includes the steps of: (1) starting the motor upon a first signal from the thermostat and a second signal from the sail switch; (2) operating the motor in a high speed mode; (3) prepurging the heat exchange system; (4) igniting a fuel; (5) verifying whether the flame furnace has been ignited; and (6) interpurging the system and reigniting the fuel if the fuel is not ignited.

BRIEF DESCRIPTION OF DRAWINGS

The preferred exemplary embodiment of the present invention will hereinafter be described in conjunction with the appended drawings, wherein like designations denote like elements.

DETAILED DESCRIPTION OF PREFERRED EXEMPLARY EMBODIMENTS OF THE PRESENT INVENTION

Figure 1:
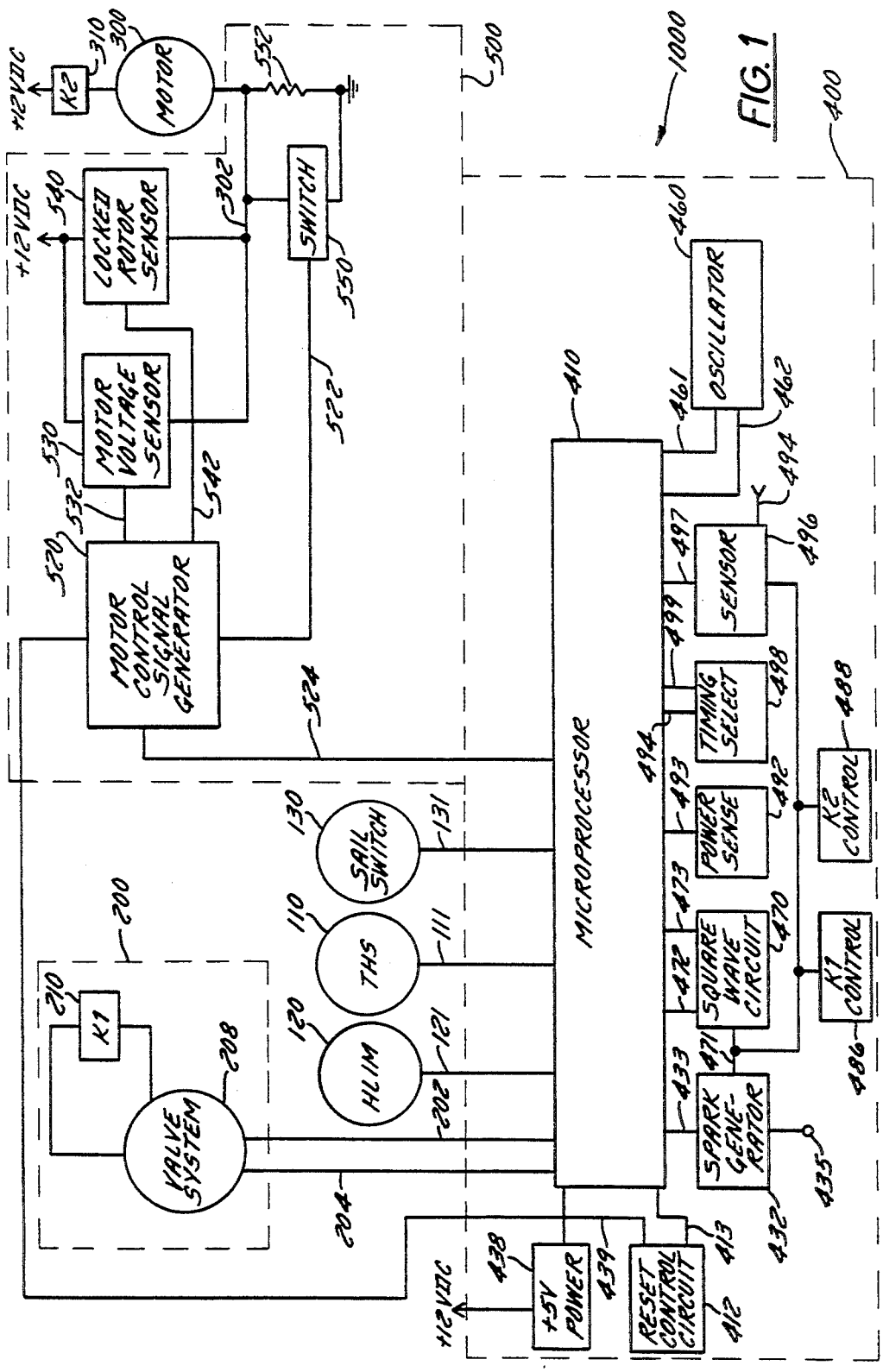
FIG. 1 is a general block diagram of a preferred exemplary embodiment of the present invention.

With reference to FIG. 1, a block diagram of the preferred exemplary embodiment of a heating system 1000 includes a motor controller 500, an ignition controller 400, a motor 300 and an gas control 200. Ignition controller 400 is coupled to gas control 200 via a conductor 202 and a conductor 204. Ignition controller 400 is also coupled to motor controller 500 via a conductor 524.

Ignition controller 400 includes a power supply 438, a reset control circuit 412, a spark generator 432, a spark discharge point 434, a squarewave generator circuit 470, a relay control circuit 486, a relay control circuit 488, a flame sensor circuit 496, a timing selector circuit 498, a power sense circuit 492, an oscillator 460, and a microprocessor 410. Microprocessor 410 is coupled to power sense circuit 492 via a power sense conductor 493, to flame sensor circuit 496 via a flame sense conductor 497, to timing selector circuit 498 via a conductor 494 and a conductor 499, and to squarewave generator circuit 470 via a conductor 472 and a conductor 473.

Microprocessor 410 receives signals from a high limit switch 120 via a conductor 121, from a thermostat 110 via a conductor 111, and from a sail switch 130 via a conductor 131. Thermostat 110, switch 120, and switch 130 are well known in the art.

Thermostat 110 is a switch which opens and closes in response to temperature. The thermostat unit should be placed in the living area of the RV in a position where accurate temperature readings may be obtained.

High limit switch 120 is opened when the temperature near the combustion chamber or heat exchanger is greater than a threshold limit. Switch 120 is generally a bi-metallic high limit switch device attached at or near the combustion chamber. Thus, high limit switch 120 signals ignition controller 400 to take appropriate action when a high limit condition is sensed.

Sail switch 130 indicates whether air flow is traveling out of the heat exchanger. Sail switch 130 is open when air is not being forced out of the heat exchanger by the blower. Sail switch 130 is generally a switch that determines air flow by means of a pressure sensor, or force sensor which are generally known in the art. Sail switch 130 provides a signal via conductor 131 to ignition controller 400. Preferably, sail switch 130 includes a pivotably mounted vane attached near an air duct associated with the heat exchanger. The vane is equipped with an electrical switch that is moved when the vane moves.

Gas control 200 controls the amount of gas or fuel supplied by the gas valves. Valve system 208 includes gas valves which are turned ON or OFF in response to electric signals. Gas control 200 is coupled to microprocessor 410 via a conductor 202 and a conductor 204.

Electrically controlled gas valves are well known in the art.

Switch 210 controls the supply of power to gas control 200 in response to control circuit 486. Preferably, switch 210 is a relay switch, and circuit 486 utilizes a coil for manipulating switch 210. When power is not supplied to the valves in valve system 208, the valves are turned OFF regardless of the signals at conductors 202 and 204. Thus, switch 210 provides a redundant procedure for turning the gas valves in system 208 OFF.

Motor controller 500 includes a motor control signal generator 520, a motor voltage sensor 530, a locked rotor sensor 540, a switch 550, and a resistor 552. Motor control signal generator 520 is coupled to power supply 538 via a conductor 439, to microprocessor 410 via conductor 524, to motor voltage sensor 530 via a conductor 532, and to locked rotor sensor 540 via a conductor 542.

Motor 300 is coupled to a 12 volt DC signal from supply 15 through a switch 310. Preferably, switch 310 is a relay switch, and circuit 488 utilizes a coil for controlling switch 310. Motor 300 is coupled to resistor 552, to locked rotor sensor 540, and to motor voltage sensor 530 via a conductor 302.

With reference to FIG. 1, the operations of a preferred exemplary embodiment of heating system 1000 are explained as follows. Microprocessor 410 generates a plurality of signals for controlling the operations of heating system 1000. Although shown as part of ignition controller 400, microprocessor 410 may be located in various other systems including motor controller 500 or gas control 200. The +12 VDC signal may be from a battery power source (not shown) or a full wave rectified voltage source from a converter (not shown).

Microprocessor 410 receives a signal at conductor 413 from reset control circuit 412. The signal at conductor 413 is preferably input to a reset terminal of microprocessor 410. As is well known in the art, signals at the reset terminal cause microprocessor 410 to alternate between an active and rest state during each cycle. Preferably, reset control circuit 412 can be configured to provide a 2.5 millisecond active state followed by a 0.05 millisecond rest state.

Supply 438 is a +5 VDC power supply which receives a +12 VDC signal from source 15. Supply 438 preferably provides a +5 volt signal to microprocessor 410 and to reset control circuit 412 via a conductor 439.

Microprocessor 410 provides signals to squarewave generator circuit 470 via conductors 472 and 473. Circuit 470 produces a squarewave signal in response to alternating signals at conductors 471 and 472. Squarewave generator 470 supplies a squarewave signal to spark generator 432, control 486, control 488 and sensor 496 via a conductor 471. Preferably, microprocessor 410 produces approximately 196 Hz signals which are inverses of each other at conductors 472 and 473 so that squarewave generator circuit 470 produces a 24 VAC 196 Hz signal.

Microprocessor 410 also controls spark generator 432 via conductor 433. Spark generator 432 provides a spark at point 434 for gas control 200. The spark at spark point 434 ignites gas in gas control 200. Spark generator 432 preferably generates sufficient voltage for creating a spark at point 434. Point 434 is located in the combustion chamber. A spark gap (not shown) is a distance between ground and spark point 434. Preferably, spark generator 432 produces an approximately 13K volt signal at point 434. The spark gap is preferably 0.1" to 0.125" wide.

Spark generator 432 generally receives the squarewave signal via conductor 471. Spark generator 432 produces a spark in response to a firing signal from microprocessor 410 at conductor 433. Thus, microprocessor 410 must provide squarewave signals and the firing signal in order for a spark to be produced at point 434.

Oscillator 460 provides a four megahertz (MHz) signal to microprocessor 410 via a conductor 462 and a conductor 461. Timing selector circuit 498 provides a signal to microprocessor 410 to select timing for certain operations at conductors 494 and 499.

Flame sensor circuit 496 is coupled to a probe (not shown) at a terminal 491. Circuit 496 generally receives a squarewave signal at conductor 471 from circuit 470. Sensor 496 provides a flame sense signal indicating that a flame is present in the combustion chamber at conductor 497. The probe (not shown) coupled at terminal 491 is a device which senses a flame. Preferably, the probe is a high temperature metal located near or within the flame. Terminal 491 provides a squarewave signal to the metal which is grounded. If a flame is present, the probe provides a DC signal at terminal 491. Microprocessor 410 senses the DC signal at terminal 491 at conductor 497. Thus, flame sensor circuit 496 provides an apparatus for monitoring the flame associated with gas control 200.

Power sense circuit 492 provides a signal to microprocessor 410 via conductor 493. Power sense circuit 493 generally indicates whether microprocessor 410 has been just turned ON. If microprocessor 410 has just been turned ON, a signal at conductor 493 is low. If microprocessor 410 has been ON for more than one cycle, the signal at conductor 493 is high. Thus, microprocessor 410 determines if microprocessor 410 was reset by a power ON reset or the signal at conductor 413 via conductor 493.

Control 486 and control 488 operate switch 210 and 310, respectively. Control 486 and control 488 close switches 210 and 310, respectively in response to a 24 VAC squarewave signal at conductor 471. Thus, microprocessor 410 closes switches 210 and 310 by providing squarewave signals at conductors 472 and 473.

Motor controller 500 adjusts the speed of motor 300. Preferably, ignition controller 400 controls the starting and stopping of motor 300 via switch 310. When switch 310 is closed, motor 300 is started. As is well known in the art, motor controller 500 could be configured to provide starting and stopping functions without the use of switch 310.

When the +12 VDC signal is provided to motor 300, current travels through motor 300 and resistor 552 to ground. Resistor 552 provides a current limiting apparatus which prevents the entire voltage from being applied across motor 300. The current limiting feature of resistor 552 decreases the speed of motor 300. Thus, when current travels across resistor 552 to ground, motor 300 operates in a low speed mode.

Preferably, resistor 552 is a high power resistive element generally made out of nichrome wire which can operate as a current limiting element. Resistor 552 should be positioned so that heat dissipated from resistor 552 is received by heating system 1000 so that the power associated with resistor 552 is reclaimed by the heat exchanger.

Resistor 552 is preferably sized so that the maximum specified voltage across resistor 552 is equal to approximately the difference in the optimum operating voltage of motor 300 and the maximum voltage provided by source 15. The resistor value for resistor 552 is generally equal to the voltage across resistor 552 at maximum voltage for source 15 divided by the running current through motor 300. Preferably, motor 300 has a 10 ampere (A) running current and a 10 VDC voltage drop under normal operating conditions. Therefore, resistor 552 is preferably a 0.6 ohm 60 watt resistive element because the maximum voltage for source 15 is approximately 16 volts.

In order to operate at a high speed mode, resistor 552 is short circuited by switch 550 so that the entire voltage from source 15 is across motor 300. When a control signal is provided at conductor 522, switch 550 closes and provides a path to ground bypassing resistor 552. Thus, the entire voltage of the +12 VDC signal is applied across motor 300 when switch 550 is closed. When the entire voltage is applied across motor 300, more current travels through motor 300 causing motor 300 to operate in a high speed mode.

Microprocessor 410 signals motor controller 500 to enter the high speed mode via conductor 524. When motor control signal generator 520 receives a control signal at conductor 524, motor control signal generator 520 preferably provides a pulse signal to switch 550 at conductor 522. Switch 550 is modulated ON in response to the pulse signal at conductor 522. The instantaneous change in the current in motor 300 in response to the ON/OFF state of switch 550 is very low due to the large inductive component of motor 300. However, the average current in motor 300 is proportional to the pulse width of the signal at conductor 522.

The design of motor controller 500 including resistor 552 and switch 550 provides various advantages. The amount of energy absorbed by switch 550 is minimized because the current in motor 300 is being modulated between half current and full current instead of full current to no current. Further, large in-rush currents at start-up and changes of motor speed are prevented because one half peak value is used during the low speed mode.

Motor control signal generator 520 may provide a 0% duty cycle (almost entirely OFF) to a 100% duty cycle (almost entirely ON) signal to switch 550. The duty cycle is the amount of time that a signal at conductor 522 is ON divided by the period of the signal. Motor control signal generator 520 adjusts the pulse width of the signal at conductor 522 in accordance with a control signal from motor voltage sensor 530 at conductor 532. Thus, motor control signal generator 520 causes motor 300 to run faster by increasing the duty cycle of the pulse signal or to run slower by decreasing the duty cycle of the pulse signal.

Motor voltage sensor 530 senses the voltage across motor 300. If the voltage across motor 300 is too large, motor voltage sensor 530 sends a control signal at conductor 532 to motor control signal generator 520. Motor control signal generator 520 reduces the duty cycle of the signal at conductor 522 in response to the signal at conductor 532. Preferably, sensor 530 provides signals so that generator 520 adjusts the duty from 100% to 0% over the approximately 9 to 16 VDC operating range of source 15. Thus, voltage sensor 530 provides a closed loop response which controls the speed of motor 300.

Locked rotor sensor 540 also senses the operating characteristics of motor 300 via conductor 302. Locked rotor sensor 540 detects the back EMF associated with motor 300. The back EMF of motor 300 indicates the speed at which motor 300 is turning. If the back EMF of motor 300 is not great enough, locked rotor sensor 540 generates a locked rotor signal at conductor 542 indicating that motor 300 is not turning properly. Preferably, motor control signal generator 520 turns switch 550 OFF in response to the signal at conductor 542. Thus, motor 300 is protected from malfunction and burnout due to operation at a high speed mode when the rotor is not turning properly.

Figure 2A:
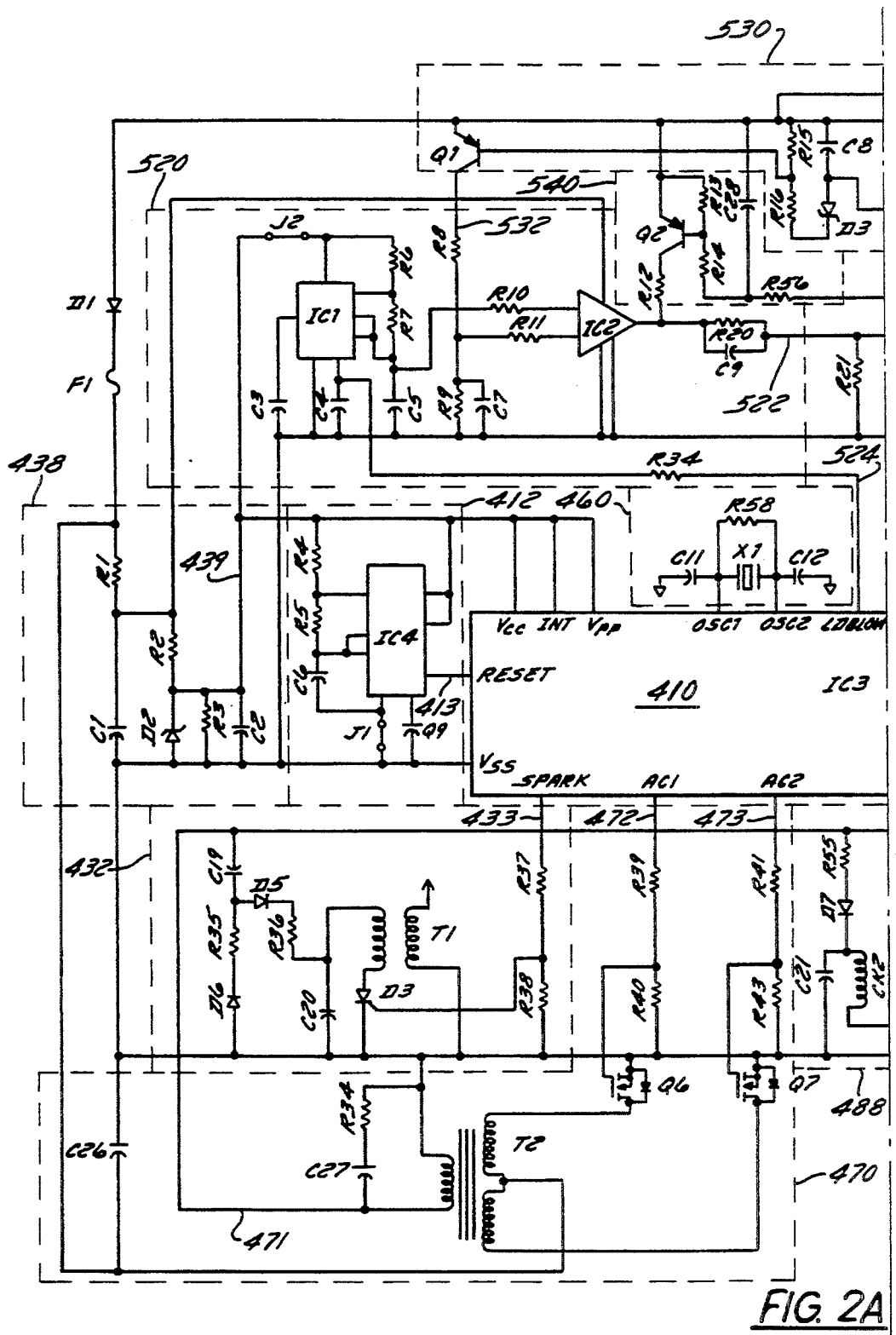
FIGS. 2A and 2B (hereafter FIG. 2) are a detailed electrical schematic of the preferred exemplary embodiment of the present invention.
Figure 2B:
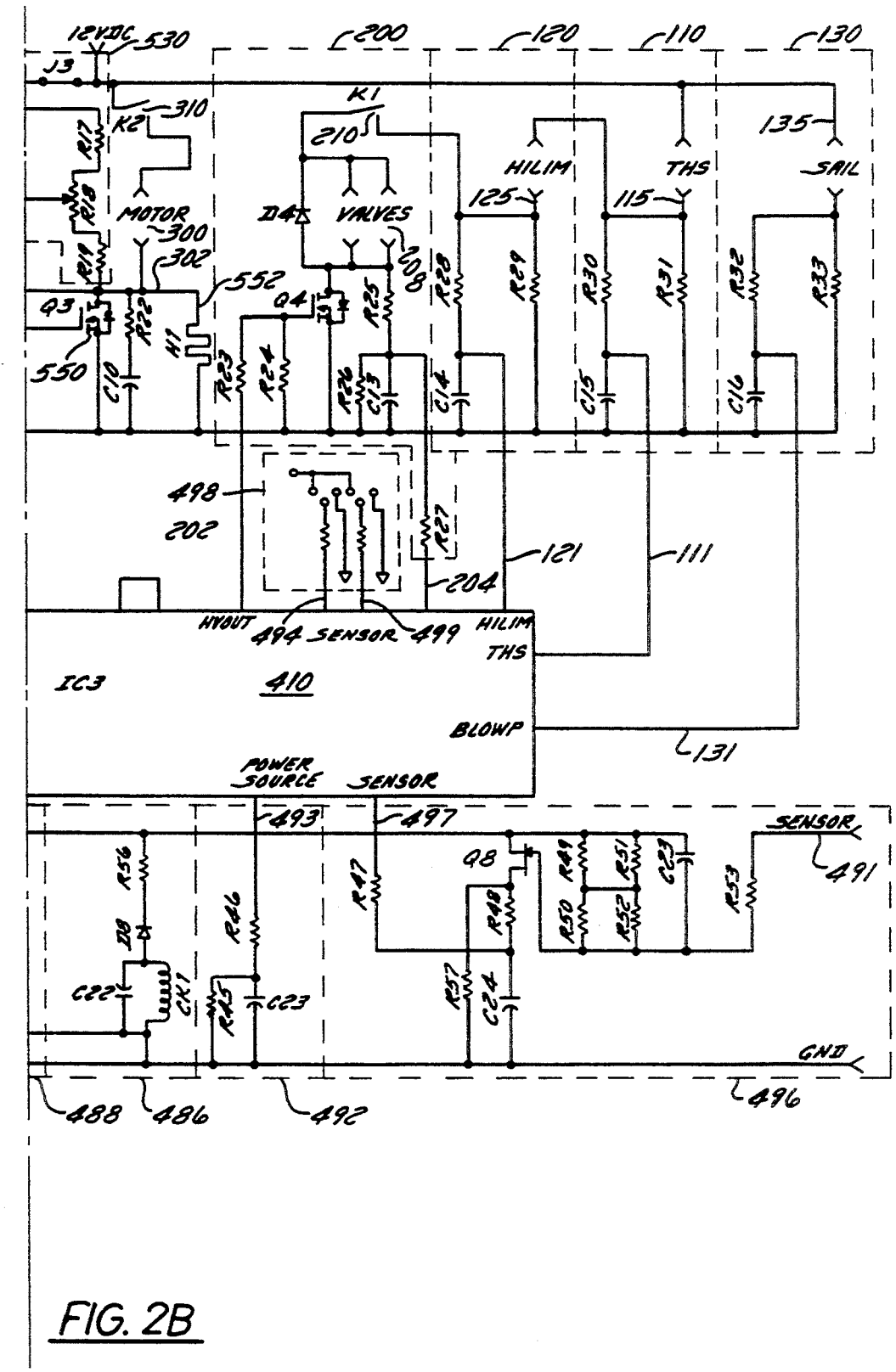
Figure 3:
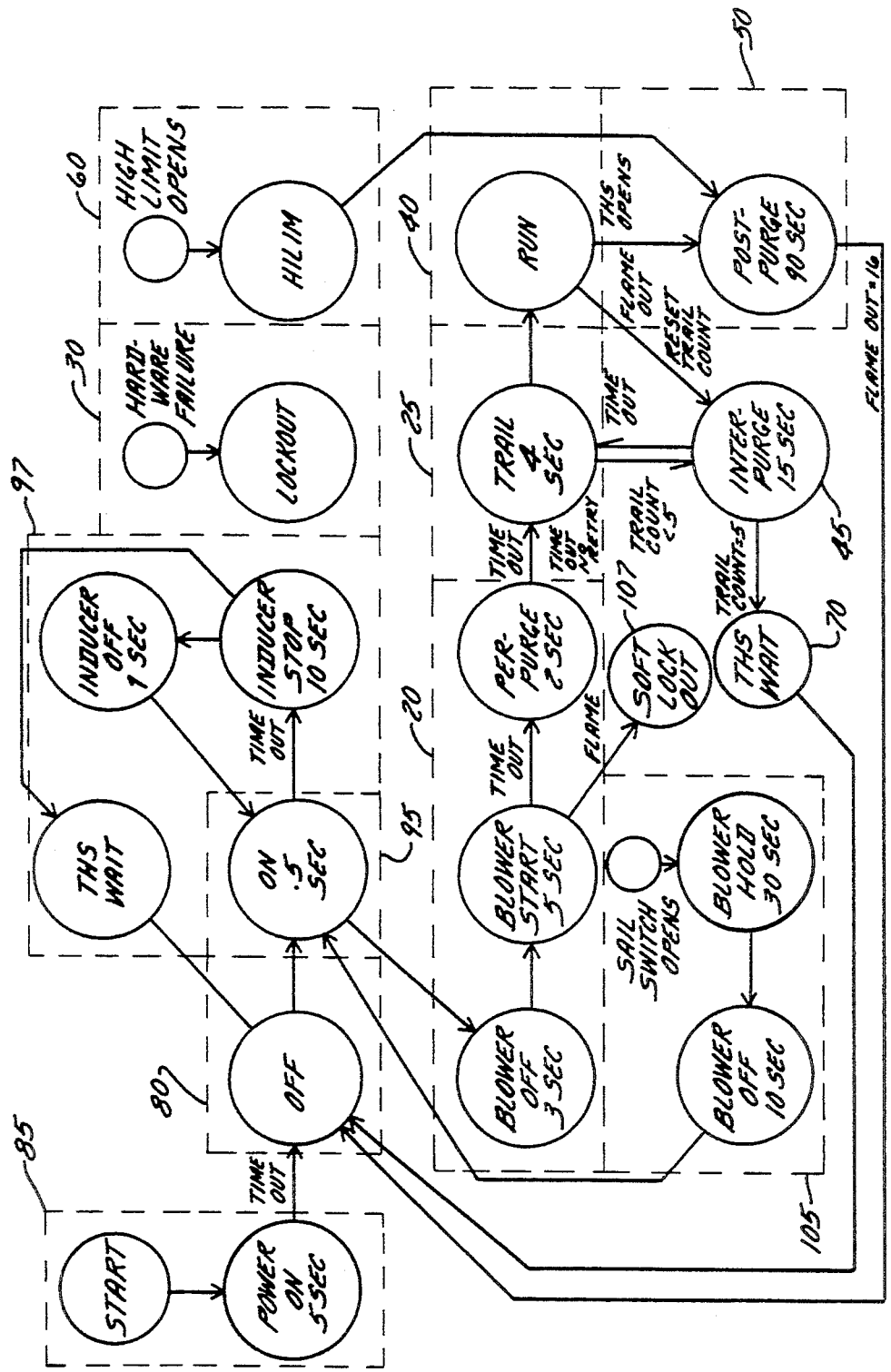
FIG. 3 is a state diagram of the preferred exemplary embodiment of the present invention.

With reference to FIG. 2, a more detailed electrical schematic in accordance with the preferred exemplary embodiment of heating system 1000 includes ignition controller 400, motor controller 500, gas control 200, and motor 300. The preferred values associated with the various components in FIG. 3 are provided in Table I. Jumpers are shown in FIG. 3; the jumpers simplify the PC board layout and have no significant operational purpose.

Motor controller 500 is coupled to microprocessor 410 via conductor 524. Motor controller 500 includes motor control signal generator 520, motor voltage sensor 530, locked rotor sensor 540, and switch 550. Switch 550 is preferably a power FET such as a transistor Q3 used to bypass resistor 553 such as a resistor Hi. Motor 300 is coupled in series with switch 310 such as a relay switch K2 and is coupled in series with resistor H1.

Motor control signal generator 520 includes a timer IC1, a comparator IC2, resistors R6, R7, R8, R9, R10, R11, R20, R21 and R34, and capacitors C3, C4, C5, C7 and C9. Timer IC1 is preferably a 555 timer for providing a ramp signal for the positive terminal of comparator IC2. Timer IC1 receives a five volt signal from 5 volt source 438 at conductor 439. Timer IC1 preferably produces a 1.7 to 3.3 20 KHz ramp signal.

The operations of motor controller 500 are described as follows. Motor control signal generator 520 receives a speed mode signal from microprocessor 410 via conductor 524. When microprocessor 410 brings conductor 524 high, timer IC1 is enabled and produces an approximately 20 kilohertz ramp signal to the positive terminal of comparator IC2 for the high speed mode operation. If conductor 524 is low, timer IC1 is disabled and a low signal is provided at the positive terminal of comparator IC2.

Comparator IC2 provides a 20 kilohertz pulse width modulated signal to transistor Q3 at conductor 522. Comparator IC2 and associated components are well known in the art and explained in product literature associated with comparator IC2. Resistor 20 and capacitor C9 provide a filter for the pulse width modulated signal.

Comparator IC2 turns transistor Q3 ON when the positive terminal of comparator IC2 is greater than the negative terminal of comparator IC2. The duty cycle of the signal at conductor 522 is largely the result of the voltage level at the negative terminal of comparator IC2 because the signal at the positive terminal is the 20 KHz ramp signal provided by timer IC1. However, if microprocessor 410 has provided a low signal at conductor 524, the signal at the positive terminal is 0 VDC and comparator IC2 produces a low signal which turns transistor Q3 OFF. Thus, motor control signal generator 520 provides signals to transistor Q3 in response to the signal at conductor 524 from microprocessor 410.

Generator 520 also responds to signals from motor voltage sensor 530. The voltage level at the negative terminal of IC2 is controlled by sensor 530. Sensor 530 includes a transistor Q1, resistors R15, R16, R17, R18, and R19, a capacitor C8, and a diode D3.

Transistor Q1 provides voltage to the negative terminal of comparator IC2 through a voltage divider consisting of resistor R8 and resistor R9. Capacitor C7 provides a filter and a storage device for the voltage signal at the negative terminal of comparator IC2. When transistor Q1 is turned ON current flows through resistor R8 and resistor R9 and into capacitor C7. Thus, when transistor Q1 is turned ON, the voltage at the positive terminal of capacitor C7 may reach 5.5 V.

When transistor Q1 is turned OFF, current does not flow through the voltage divider including resistors R8 and R9 and the voltage at the negative terminal of comparator IC2 decreases. Thus, when transistor Q3 is turned OFF, capacitor C7 discharges and the voltage at the positive terminal of capacitor C7 decreases. The filtering effects associated with the RC time constant of capacitor C7 and resistor R9 provide a stable signal at the negative terminal of comparator IC2 as transistor Q1 is modulated ON and OFF.

Transistor Q1 is turned ON and OFF by a signal at the base of transistor Q1. When the voltage provided at the base of transistor Q1 falls below the voltage of the 12 VDC signal by approximately 0.7 volts, transistor Q1 is turned ON. When the voltage at the gate of transistor Q1 is less than 0.7 volts below the +12 VDC supply, transistor Q1 is turned OFF. The voltage signal at the gate of transistor Q1 is provided by resistors 15 and 16.

A resistor network including resistor R17, R18 and R19 senses the voltage across motor 300. Resistor R18 is preferably a potentiometer that has been tuned so that an appropriate voltage drop occurs across the 12 VDC signal to the wiper of resistor R18 when motor 300 is operating. Preferably, resistor R18 is set so that transistor Q1 is turned ON when the voltage across motor 300 is greater than 10 VDC or the preferred operating voltage.

Resistor R15, resistor R16 and diode D3 provide a network for sensing the voltage between resistor R17 and the wiper of resistor R18. Diode D3 is preferably a 5.1 volt zener diode. Therefore, if 10 volts is across motor 300, more than 5.8 volts is between the 12 VDC voltage signal and the wiper of resistor R18. If 5.8 volts are between the wiper of resistor R18 and the 12 voltage source, zener diode D3 conducts and approximately 0.7 volts is across resistor R15 and R16. Most of this 0.7 volts is across resistor R15 because of the large difference in resistance between resistors R15 and R16. Thus, when approximately 0.7 volts is across resistor R15, transistor Q1 is turned ON. Therefore, when the voltage across motor 300 approaches 10 volts, transistor Q1 is turned ON.

Locked rotor sensor 540 provides a signal to motor control signal generator 520 at conductor 542. Locked rotor sensor 540 includes a transistor Q2, a resistor R13, a resistor R14, a capacitor C28, a resistor R56, a resistor R12, and a capacitor C28. Locked rotor sensor 540 senses the back EMF associated with motor 300 at conductor 302. Resistors R13, R14, and R56 and capacitor C28 provide a network for detecting the back EMF associated with motor 300. If sufficient back EMF is present (indicating that the rotor is turning), transistor Q2 is turned ON and power is supplied through resistor R12 to the open collector output of comparator IC2 at conductor 542.

Transistor Q2 provides voltage to drive transistor Q3 and thus enables the high speed mode of motor controller 500. If transistor Q2 is not turned ON due to insufficient EMF, sufficient current is not provided to the open collector output of comparator IC2 and transistor Q3 is turned OFF. Thus, with transistor Q3 turned OFF, motor 300 continues to operate in the low speed mode because comparator IC2 cannot drive transistor Q3.

With reference to FIG. 2, ignition controller 400 includes power supply 438, reset control circuit 412, spark generator 432, spark discharge point 434, squarewave generator circuit 470, relay control circuit 486, relay control circuit 488, flame sensor circuit 496, timing selector circuit 498, power sense circuit 492, oscillator 460, and microprocessor 410. The operation of ignition controller 400 is described as follows.

Microprocessor 410 controls relay switch K2 through control 488. Control 488 includes a resistor R55, a diode D7, a capacitor C21, and a relay coil CK2 which is associated with relay switch K2. When coil CK2 receives the squarewave signal at conductor 471, coil CK2 is energized and switch K2 is closed. Control 488 is a well known relay switch control circuit. Control 486 operates essentially the same for opening and closing switch 210 such as a relay switch K1.

Reset control circuit 412, spark generator 432, squarewave generator circuit 470, control circuit 488, flame sensor circuit 496, timing selector circuit 498, power sense circuit 492, and oscillator 460 are generally well known in the art. Oscillator 460 and circuit 498 are discussed in data sheets associated with microprocessor 410.

Power sense circuit 492 includes a resistor R46, a capacitor C23, and a resistor R45. Capacitor C23 receives current via conductor 493 from microprocessor 410 when microprocessor 410 is in the active state. Capacitor C23 and resistors R46 and R45 interact to provide a logic HIGH signal at conductor 493 after microprocessor 410 is reset. Microprocessor 410 determines that microprocessor 410 is not in the first cycle after power ON because conductor 497 is a logic HIGH. In the first active state after microprocessor 410 is turned ON, capacitor C23 is not charged up, and a logic LOW is provided at conductor 493.

Supply 438 includes a resistor R1, a resistor R2, a diode D2, a capacitor C1, a capacitor C8, and a resistor R3. Resistors R1 and R2 provide a network so that zener diode D2 can provide approximately 5 volts at conductor 439. Capacitor C8 and resistor R3 provide a filter for the +5 volt signal provided at conductor 439.

Reset control circuit 412 includes a voltage divider including a resistor R4 and a resistor R5. Circuit 412 also includes a capacitor C6, a capacitor C29, and a CMOS timer IC4, preferably a 555 timer which are well known in the art. Timer IC4 provides an output at conductor 413 to a reset terminal in microprocessor 410. More particularly, timer IC4 preferably produces a repetitive signal including a 2.5 millisecond period of HIGH output followed by a 50 microsecond period of LOW output. The HIGH output is preferably 5 VDC which is greater than the reset threshold. The LOW output is preferably ground. Resistor R4, resistor R5 and capacitor C6 provide the appropriate inputs to timer IC4 so that timer IC4 provides the appropriate signal at conductor 413. The various interconnections between components associated with reset control circuit 412 are described in the product literature associated with timer IC4.

Thermostat 110 includes a switch 115, resistor R31, a resistor R30 and a capacitor C15. Switch 115 is coupled to the +12 VDC voltage source and to a first end of resistors R30 and R31. When switch 115 is closed, current travels through resistor R30 and across conductor 111 to microprocessor 410. Capacitor C15 provides a filter between conductor 111 and ground.

Sail switch 130 includes switch 135, a resistor R32, a resistor R33 and a capacitor C16. Switch 135 is coupled to +12 VDC voltage source. When switch 115 is closed, current travels across resistor R32 and conductor 131 to microprocessor 410. Capacitor C16 provides a filter between conductor 131 and ground.

High limit switch 120 includes a switch 125, a resistor R28, a resistor R29 and a capacitor C14. Switch 125 has a first terminal coupled to switch 210 and a second terminal coupled to switch 115. If switch 115 is closed, and switch 25 is closed, current travels across resistor R28 and conductor 121 to microprocessor 410. Thus, microprocessor 410 cannot sense the state of switch 125 if switch 115 is open.

Gas control 200 is provided power through switch 125 and relay switch K2. Gas control 200 includes valve system 208, a diode D4, a transistor Q4, a resistor R23, a resistor R24, a resistor R26, a capacitor C13, a resistor R25, and a resistor R27. The position of valve system 208 is sensed through a voltage network including resistors R25, R26, and R27. The signal representing the position of valves 210 in valve system 208 is provided via conductor 204 to microprocessor 410. A control signal from microprocessor 410 is provided to gas control 200 across conductor 202, resistor R23 and resistor R24. The control signal is provided to transistor Q4. Transistor Q4 turns valves 210 ON and OFF in response to the signal at conductor 202. Gas control 200 is well known in the art.

The operation of system 1000 is described with reference to FIG. 2, FIG. 3, FIG. 4 and FIG. 5 as follows. A program or software system in microprocessor 410 controls the operations of system 1000 as follows. As the voltage at conductor 413 exceeds the reset threshold of microprocessor 410, microprocessor 410 executes a predetermined program prior to resuming a rest state. In the predetermined sequence of operation, a portion of the operating cycle involves known initialization of internal power-up routines and checks.

Microprocessor 410 achieves desired reliability by operating a linear program. The linear program is designed with a minimum of branching and no branch subroutines. This permits the prediction of potential microprocessor failure modes. The system of the invention relies on the software to check the data integrity from one pulse at conductor 413 to the next pulse at conductor 413.

According to the structure of the linear program, the microprocessor first checks itself for data integrity and then performs necessary operations. Next, the program sets up for the next cycle by generating the necessary data for the next check cycle, and then locks itself into wait condition which can only be stopped by the occurrence of a RESET signal.

In order to accomplish this type of linear programming, the system is table driven. A set of pointers to the data in the tables is maintained in the checked-data area. These table pointers are used to find the timing between the steps in the states of the operating cycle.

With reference to FIG. 3, the operating cycle of system 1000 is made of steps, states, or modes including a pre-purge state 20, an interpurge state 45, a post purge state 50, a run state 40, a lock out state 30, a high limit state 60, and an OFF state 80. Each of the states are further broken down into substates or steps which allow the system to do system integrity checks such as the steps shown in FIG. 4.

Figure 5:
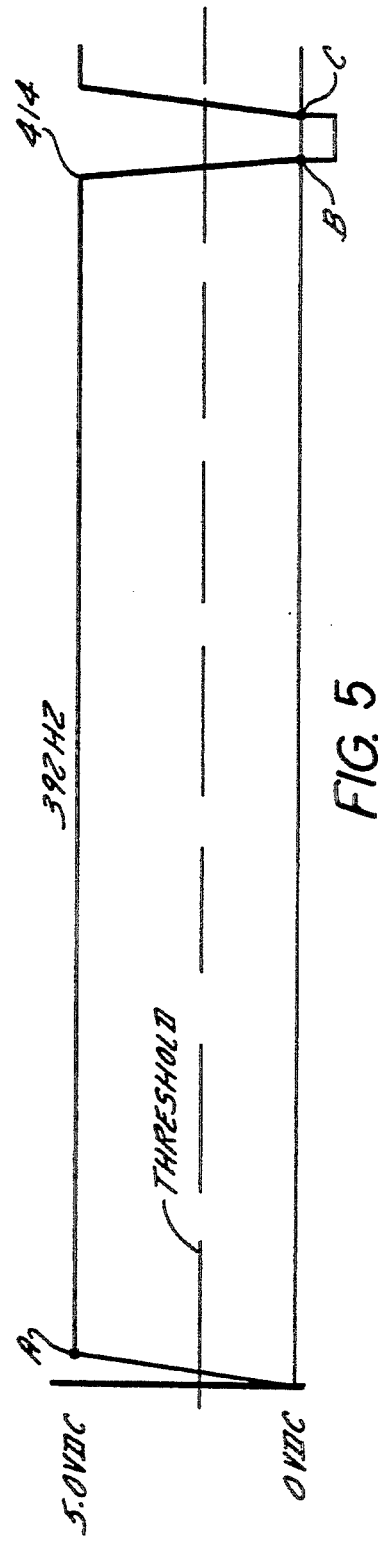
FIG. 5 is a waveform diagram of a reset signal in accordance with the preferred exemplary embodiment of the present invention.

With reference to FIG. 5, the signal at conductor 413 is preferably a waveform 414. Every time microprocessor 410 is reset, microprocessor 410 executes a program starting at a known point prior to reverting to an inactive state until the next RESET pulse. In this manner, any software errors due to the noise and other system or component characteristics, propagate for a maximum time of 2.55 milliseconds (the length of waveform 44) and are corrected upon the reset during the next machine cycle. This feature allows only small amounts of unburned gas to escape before the error is corrected or system 1000 is shut down because the 2.55 millisecond time interval is so brief.

In a preferred embodiment, when the voltage on the reset terminal exceeds threshold level T at a point A on waveform 414, microprocessor 410 starts to execute the resident program at a predetermined point which is read out from a fixed location in the memory map of microprocessor 410. The fixed point is preferably address $1FFE when microprocessor 410 is a 68HC805 microcontroller. The program then continues to run until it stops itself with a WAIT or STOP command or the program is stopped by the hardware reset condition when the voltage of waveform 414 such as at a point B is detected to be below threshold level T. The threshold level T is preferably approximately 2.5 VDC.

One difficulty encountered in the implementation of the program is that the processing time is limited to approximately less than 2.5 milliseconds per cycle. If different reset cycles are used, the program should be adjusted for the appropriate processing time.

Preferably, the program may be appropriately bifurcated or divided into one or more discrete operating envelopes for operation in successive reset cycles. This division of the program is advantageous when the signal at conductor 413 does not provide sufficient time to fully execute all the steps 1–9 in the program. For example, the operating program may be divided into first and second halves.

During the first half, system 1000 is checked for power-on conditions, followed by the timer routines, the input routines, the setup of the output pits, and the generation and storing of the CRC data. During the second half of the program, the system 1000 checks for the basic mode and flag type errors, and compares the existing CRC data to the CRC data generated by the previous half of the program. System 1000 then checks the flame sensing circuit 496 and provides the appropriate outputs at conductors 472, 473, and 433.

Microprocessor 410 must execute a known amount of the program during the time when the signal at conductor 413 is high, and the program or system must also be able to guarantee that the data in the microprocessor random access memory (RAM) is correct for the next cycle's operation upon the occurrence of the next RESET. This difficulty is due to the apparent lack of difference between a traditional "power-on" RESET when the system starts up with no known state in the RAM and the synchronous RESET in accordance with the invention which is necessary for the reliability of the circuit. The decision concerning the state of the machine must be based on the integrity of the data. The manner in which the integrity of the data is checked, the linear nature of the executed program, and the detailed operation of the program through one active cycle of microprocessor 410 will be described herein with references to FIGS. 2, 3, 4 and 5.

Points A and B (FIG. 5) designate the beginning and end, respectively, of the active microprocessor cycle. The first set of data checks, as indicated at a step 1 (FIG. 4), is to look up the flag byte of the mode or state (i.e., pre-purge state 20, run state 40, lockout state 30) of the state machine in a table. If the flag byte is not one of several predetermined values, then the program is assumed to be coming out of a "power-on" reset. The probability of this test detecting the program is coming out of a "power-on" reset is high because the RAM of microprocessor 410 has a tendency to come up as all "0's" or all "1's" depending on the design of the chip. The likelihood of a random match occurring between a pair of mode or state flags is at best remote. This, however, is not an acceptable level of reliability in a safety circuit so an additional test is done.

Figure 4:
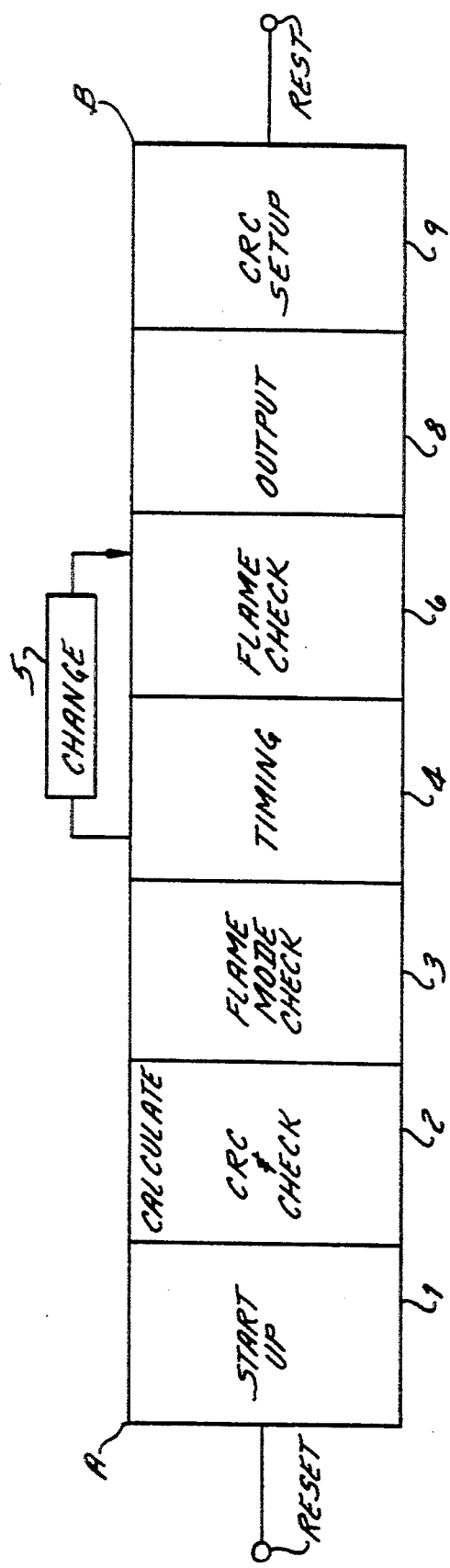
FIG. 4 is a diagram of a linear program in accordance with the preferred exemplary embodiment of the present invention.

The final data validity is checked using the well known cyclical redundancy check (CRC), as shown at a step 2 in FIG. 4. The CRC is normally used in serial data transmission and in the data storage systems such as disks. The data which is generated by the CRC is stored by the program at the end of one cycle and compared to the recalculated value at the beginning of the next cycle. If this newly calculated data does not match the previously stored data, then system 1000 is assumed to be coming out of a "power-on" reset and not a synchronous reset.

The other means employed for proving data integrity, shown at step 3, is to permit the flags for non-counting data, such as the flame mismatch flag, to have only non-calculable states (i.e., of a simple increment of a single bit) so that an erroneous calculation before storage (at step 9) should not be able to be stored as a valid state. This test is based on the probability of types of errors which are possible in a processor environment. It is, of course, possible for totally random data errors to be stored which cannot be detected as invalid. To further minimize the possibility of such improbable happenstance, the timers are all non-zero based. In order for the validity test to be passed, the counter values must be in windows of valid values.

In addition to the overall data validity, the safety timers and counters are stored both in normal and complement states. When a timer or counter is changed as at step 4, one counter is incremented and the other is decremented. The counters are loaded with complementary values so that after each change in the count, the values are equal. The reason for using complements is that if a bit of the bus or ALU (arithmetic logic unit) are locked into one logic value, then the values of the flag bytes cannot pass the validity test. If at any time the counters are not equal, the system goes to a lock-out mode.

When the mode or the state is changed (as at step 5) by either the counter reaching a predetermined value or the change of state of an input to microprocessor 410, the software performs a number of tests on the validity of the switch from one state to the other. (An example of a change of state may be detection of a flame and the subsequent entry into Run state 40.) The program looks up the next desired state from a list. The new mode or state is then used to look up the flag byte value of the mode from the previous mode. If the bytes match, then the new flag byte of the mode or state is stored and the times for the new state are loaded from queue tables, a count-up table and a count-down table.

The program utilizes a table driven state machine. The state machine controls a set of linear processes which last for a fixed time if the inputs are consistent with the defined required states. If an error in the inputs exists, the program switches to a predetermined new linear set of states stored in a table in the state machine. Thus, the program sets up a lock-out state, calculates and stores CRC values, and enters the inactive state in response to an error. The state machine's ability to enter new sets of states allows the program to handle any exceptional input conditions.

On entering a new state, system 1000 checks for the presence of a flame at a step 6. Flame sensor circuit 496 utilizes a synchronous detection scheme which is at least partially self-checking. The program alternately discharges capacitor C24 every predetermined number of cycles of waveform 414 to detect if flame sensor circuit 496 is improperly short circuited to a DC source. If sensor circuit 496 is short circuited to a DC source, microprocessor 410 is not able to detect the flame as required at step 6 and the program enters a lock out state which is only exited by a power interruption. If microprocessor 410 senses a logic HIGH at conductor 497 before a requisite number of cycles after capacitor C24 is discharged, microprocessor 410 determines that a DC source is short circuited to sensor circuit 496.

At step 6, microprocessor 410 checks if a flame is present. As discussed previously, flame sensor circuit 496 provides a logic HIGH at conductor 497 when a flame is present. When microprocessor 410 senses a logic level high at conductor 497, the program has detected a flame. Because of noise on the power lines and flickering due to the nature of a gas flame, the program only considers the presence or absence of a flame if the presence or absence is detected twice in a row.

Microprocessor 410 receives signals at conductor 493. The program compares the signals at conductors 493 to values the program expects according to the current state. If the signals at conductor 493 do not match the expected values, the program increments a counter. Four cycles of mismatch cause a state change.

Output values for squarewave signal generator 470 and spark generator 432 are loaded at conductors 433, 472 and 473 based on the machine state of the program. The program provides output values at conductors 433, 472, and 473 in accordance with information detected at conductors 497 and 493 and the current machine state. Capacitors C21 and C22 are filter capacitors. Diodes D7 and D8 evenly load the waveform at conductor 471. A dead time is present to allow recharging of capacitor C27 associated with squarewave generator 470 which is physically close to microprocessor 410.

At the conclusion of one cycle of operation, microprocessor 410 calculates and stores the CRC, as shown at step 9, and assumes an inactive state in anticipation of the next RESET signal.

The following is an example of the aforedescribed method of operation as applied to a furnace or heating system 1000. With reference to FIGS. 2 and 3, as power is applied from source 15, system 1000 enters state 85 and checks the internal operating characteristics for safe operation. In state 85, microprocessor 410 performs system checks for 5 seconds and assures that microprocessor 410 is running properly.

After the 5 seconds have elapsed, system 1000 enters OFF state 80. Microprocessor 410 receives a signal at conductor 111 upon the closure of thermostat 110 as system 1000 enters ON state 95. ON state 95 senses thermostat 110 several times to assure that the signal is not an error such as a result of bounce error. As system 1000 enters ON state 95, motor 300 may be running or fully stopped. ON state 95 includes a start-up time preferably 0.5 seconds in duration. In ON state 95, microprocessor 410 checks if sail switch 130 is closed (indicating air flow) via conductor 131. If switch 130 is closed, system 1000 enters sail switch wait state 97.

In sail switch wait state 97, system 1000 holds motor 300 OFF for 10 seconds. System 1000 accomplishes this task by opening relay switch K2. If during this 10 second period thermostat 110 is opened, system 1000 waits for thermostat 110 to close and then enters OFF state 80. If thermostat 110 remains closed during the 10 second period, system 1000 holds the motor OFF for one additional second and then enters ON state 95. Wait state 97 operates to allow sail switch 130 to be opened before operation. This technique prevents improper reliance on a jammed or malfunctioning switch 130. If switch 130 does not open, visual or audio indicia of a system 1000 malfunction may be provided.

After the 0.5 seconds in ON state 95, system 1000 enters prepurge state 20. In state 20, microprocessor 410 also determines if the high limit switch 120 is closed. If switch 120 is closed, microprocessor 410 provides signals at conductors 472 and 473 so that a squarewave is generated at conductor 471 and relay switch K1 is closed. When the squarewave signal is produced at conductor 471, relay switches K1 and K2 are closed. With switch 310 closed, the low speed mode or soft start mode of motor 300 is enabled.

In the low speed mode, motor 300 receives approximately half of the voltage from source 15. If motor 300 begins turning, a back EMF is generated which reduces the current through motor 300 and the voltage across resistor H1.

System 1000 operates motor 300 in the low speed mode for approximately 3 seconds. After 3 seconds, system 1000 enables a high speed mode or regulated speed mode of motor 300. Microprocessor 410 enables the high speed mode of motor 300 by providing a logic HIGH at conductor 524. If a logic HIGH is provided at conductor 524, timer IC1 produces a ramp signal so that motor control signal generator 520 can produce a pulse width modulated signal at conductor 522.

In order for motor controller 500 to enter the high speed mode, locked rotor sensor 530 must provide power at conductor 542 by turning transistor Q2 ON. If locked rotor sensor 530 allows motor control signal generator 520 to enter the high speed mode, motor voltage sensor 530 and motor control signal generator 520 interact to regulate the speed of motor 300.

As motor voltage sensor 530 and motor control signal generator 520 regulate the high speed mode of motor 300, motor 300 comes up to a controlled speed. When motor 300 reaches the controlled speed, the air forced by the blower closes sail switch 130. The blower and sail switch 130 are designed so that sail switch 130 remains open when motor 300 is in the low speed mode. When microprocessor 410 senses that sail switch 130 is closed, microprocessor 410 runs the blower for 2 seconds in order to prepurge the heat exchanger. If sail switch 130 does not close within a predetermined amount of time, preferably 5 seconds, after microprocessor 410 enables the high speed mode at conductor 524, microprocessor 410 locks out system 1000 in lock out state 107. State 107 is resettable only by the opening and reclosing of thermostat 110 after five seconds.

The blower removes products of combustion from system 1000 in prepurge state 20. The products of combustion accumulate as the gas or fuel in gas control 200 is lit, extinguished, or attempted to be lit. Thus, prepurge state 20 preferably consists of holding the blower in the low speed mode for three seconds, starting the blower for five seconds in the high speed mode, and prepurging the heat exchanger for two seconds.

After state 20, heating system 1000 enters an ignition state 25 which consists generally of two parts. The first part includes the production of a spark at point 434 and the enabling of gas valves 210 simultaneously. If the gas is ignited, the flame is sensed during the second part of ignition state 25. The second part includes a short period where gas valve 210 are actuated without the spark. Microprocessor 410 senses the flame after the valve is actuated. The two parts of the ignition state 25 allow the flame to be sensed without interference of the spark voltage. Microprocessor 410 enables gas valves 210 by providing a logic HIGH at conductor 202 so that transistor Q4 is turned ON and 12 VDC is provided across gas valves 210. Microprocessor 410 triggers a spark voltage by providing a signal at conductor 433. When conductor 433 is a logic HIGH, transistor Q5, preferably an SCR, fires, which sends current through a diode D5, a resistor R36, and a primary of transformer T1. Transformer T1 is preferably a step-up transformer. In response to the current through the primary of transformer T1, the secondary of transformer T1 provides a high voltage signal. This high voltage signal at spark point 434 provides a spark as the current arcs to ground across the spark gap (not shown).

After the flame is sensed, system 1000 enters run state 40. In this condition, ignition controller 400 and motor controller 500 continue to operate motor 300 and gas control 200 until thermostat 110 opens or until a fault condition is sensed.

If the flame is not sensed, system 1000 enters interpurge state 45 which allows the heat exchanger to be purged of the products of combustion of the previous attempt to light the burner. Preferably, the purge time is approximately 15 seconds. After the purge time has expired, the ignition sequence is retried. Interpurge state 45 is repeated until a flame is sensed or until a predetermined number of times has elapsed. If a flame has not been sensed after a predetermined number of times, a lock-out state or off state 80 is reached. Preferably, OFF state 80 is reached after 5 attempts at ignition.

When thermostat 110 opens, microprocessor 410 closes gas valves 210 and motor 300 continues to operate at high speed for a predetermined period in post purge state 50 which allows the products of combustion to be removed from the heat exchanger. Microprocessor 410 closes gas valves 210 by providing a logic LOW at conductor 202. Also, motor 300 allows for the heat retained in the heat exchanger to be transported to the living space. After the motor 300 operates for a predetermined amount of time, preferably 90 seconds, system 1000 enters OFF state 80.

System 1000 may be removed from run state 40 if a flame is not sensed by the probe attached to sensor terminal 491. If a flame is not sensed, microprocessor 410 receives a signal at conductor 497. When microprocessor 410 receives the signal at conductor 497, microprocessor 410 causes system 1000 to enter interpurge state 45. System 1000 then enters ignition state 25 and enters run state 40 again if ignition is successful. If ignition is not successful, system 1000 eventually enters OFF state 80. Alternatively, microprocessor 410 could enter a flame out state (not shown) including visual or audio indicia of system 1000 malfunction. With reference to FIG. 4, the program in microprocessor 410 generally checks the flame at step 6 once per cycle.

System 1000 may be removed from run state 40 or any other state when a fault condition is sensed. Fault conditions include fault state 105 when sail switch 130 opens, fault state 30 when there is a hardware failure, or high limit state 60 when high limit switch 120 opens.

When high limit switch 120 is opened, motor 300 continues to operate and gas valves 210 associated with gas control 200 are shut down in state 60. Gas control 200 is denied power when switch 120 is opened. Further, microprocessor 410 sets conductor 202 to a logic LOW to redundantly turn valves 210 OFF. If the high limit switch 120 opens when thermostat 110 has not closed, microprocessor 410 cannot detect a high limit condition. Upon closure of thermostat 110, microprocessor 410 detects that high limit switch 120 is open, and enters state 60. In state 60, motor 300 operates at high speed with gas valves associated with gas control 200 closed. High limit state 60 is followed by post purge state 50.

Fault state 30 sends system 1000 into a lockout state when a hardware failure is sensed. A lockout condition shuts gas valves 210 OFF in gas control 200. Preferably, visual or audio indicia of a hardware failure is given so that the occupant pursues appropriate servicing of the unit.

Fault state 105 occurs when sail switch 130 opens indicating no air flow. System 1000 holds the blower ON for 30 seconds and turns the blower OFF for 10 seconds before entering OFF state 80.

It will be understood that while various conductors are depicted in the drawings or figures, they are not so shown in a limiting sense and may comprise plural conductors/connectors as understood in the art. Further, power and ground may be supplied to various components in the system although they are not explicitly shown in the drawings as is well known in the art. The above description is of a preferred exemplary embodiments of the present invention is not limited to the specific forms shown. For example, while the system was described with a pulse width modulated motor controller, various motor controllers could be used without departing from the spirit of the invention. Also, other modifications to the sensing and control systems employed could be changed without departing from the spirit of the invention as expressed in the appended claims.

TABLE I

| | |
|---|---|
| C1 | 100 µF |
| C2 | .1 µF |
| C3 | .01 µF |
| C4 | .01 µF |
| C5 | .01 µF |
| C6 | .1 µF |
| C7 | 22 µF |
| C8 | 22 µF |
| C9 | .1 µF |
| C10 | .01 µF |
| C11 | 22 pF |
| C12 | 22 pF |
| C13 | .01 µF |
| C14 | .01 µF |
| C15 | .01 µF |
| C16 | .01 µF |
| C19 | 22 µF |
| C20 | 3.3 µF |
| C21 | 47 µF |
| C22 | 22 µF |
| C23 | .1 µF |
| C24 | .22 µF |
| C25 | .01 µF |
| C26 | .1 µF |
| C27 | 1 µF |
| C28 | 22 µF |
| C29 | 22 pF |
| D1 | 1A4 |
| D2 | 1N5231 |
| D3 | 1N5231 |
| D4 | 1A4 |
| D5 | 1A4 |
| D6 | 1A4 |
| D7 | 1A4 |
| D8 | 1A4 |
| F1 | Fuse |
| H1 | .6, 60W |
| IC1 | 555 timer |
| IC2 | LM311 |
| IC3 | MC68HC805C4 |
| IC4 | 555 Timer, MC1555 |
| K1 | Relay Switches |
| K2 | Relay Switches |
| Q1 | 2N4403 |
| Q2 | 2N4403 |
| Q3 | MTP30N05E |
| Q4 | MTD6N10 |
| Q5 | S429 |
| Q6 | MTD6N10 |
| Q7 | MTD6N10 |
| Q8 | 2N3821 |
| R1 | 27 |
| R2 | 560 |
| R3 | 3.3K |
| R4 | 33K |
| R5 | 100 |
| R6 | 5.6K |
| R7 | 100 |
| R8 | 12K |
| R9 | 12K |
| R10 | 47K |
| R11 | 47K |
| R12 | 330 |
| R13 | 4.7K |
| R14 | 10K |
| R15 | 12K |
| R16 | 560 |
| R17 | 1.2K |
| R18 | 1K |
| R19 | 1.2K |
| R20 | 1K |
| R21 | 47K |
| R22 | 5 |
| R23 | 1K |
| R24 | 47K |
| R25 | 4.7K |
| R26 | 4.7K |
| R27 | 220K |
| R28 | 220K |
| R29 | 390 |
| R30 | 220K |
| R31 | 390 |
| R32 | 220K |
| R33 | 390 |
| R34 | 20K |
| R35 | 100 |
| R36 | 560 |
| R37 | 4.7K |
| R38 | 20K |
| R39 | 1K |
| R40 | 47K |
| R41 | 1K |

TABLE I-continued

| | |
|---|---|
| R42 | 47K |
| R45 | 330K |
| R46 | 1K |
| R47 | 1K |
| R48 | 560K |
| R49 | 22M |
| R50 | 22M |
| R51 | 22M |
| R52 | 22M |
| R53 | 10M |
| R54 | 1.5K |
| R55 | 27 |
| R56 | 10K |
| R57 | 330K |
| R58 | 27 |
| R59 | 1M |
| T1 | |
| T2 | |
| X1 | 4 mHz crystal |

All resistors are in Ohms, ¼ W, 5% unless otherwise noted.

What is claimed is:

1. A microprocessor based heat exchange system including system components for controlling temperature in an environment, said system components including a motor for driving a fan, said heat exchange system comprising:
    a processing means for processing information, said processing means having an input means for receiving an input signal and an output means for providing an output signal, said input signal conveying information about said system components;
    a motor controller means coupled with said motor for regulating speed of said motor, said motor controller means being coupled with said processing means for receiving said output signal;
    reset means for applying a reset signal to a reset terminal of said processing means, said reset signal having succeeding repetitive first and second signal levels;
    said processing means being responsive to said reset signal to assume an active state when said reset signal is at said first signal level and to assume an inactive state when said reset signal is at said second signal level, said processing means executing succeeding portions of a program to generate said output signal; and
    wherein said motor controller means regulates said speed of said motor in accordance with a power level supplied to said motor and said output signal.

2. The system of claim 1 wherein the input signal is indicative of a sail switch condition.

3. The system of claim 1 wherein the input signal is indicative of a high limit condition.

4. The system of claim 1 wherein the input signal is indicative of a flame condition.

5. The system of claim 1 wherein the input signal is indicative of a thermostat condition.

6. The system of claim 1 wherein the input signal is indicative of a gas valve condition.

7. The system of claim 1 wherein the processing means receives a plurality of input signals indicative of at least two of the following conditions: a thermostat condition, a sail switch condition, a gas valve condition, and a high limit condition.

8. The apparatus of claim 5 wherein the processing means further receives a second input signal indicative of an ignition system condition and provides an ignition system output signal.

9. A microprocessor based heat exchange system including a motor for driving a fan, said microprocessor based heat exchange system comprising:
    input means for providing input signals including a thermostat signal and a sail switch signal;
    a microprocessor means for operating a linear program, the microprocessor means producing a processor signal in response to the linear program and said input signals;
    a power limiting means for limiting power supplied to the motor;
    a power regulating means coupled to the power limiting means for providing a relatively constant power level to the motor in response to a first control signal;
    a power sense means for generating a second control signal indicative of the power supplied to the motor; and
    motor control signal generating means for generating the first control signal in response to the second control signal and the processor signal.

10. The system of claim 9, further comprising:
    a back EMF detection means for generating a third control signal;
    wherein the motor control signal generating means receives the third control signal and generates the first control signal in response to the third control signal.

11. The system of claim 9 wherein the heat exchange system includes an ignition system.

12. The system of claim 11 wherein the ignition system is is a gas ignition system.

13. The system of claim 11 wherein the system controls the motor in a blower in a Recreational Vehicle (RV) space heater.

14. A method for controlling a microprocessor based heat exchange system, the heat exchange system running a linear program in response to a cyclical signal provided at a reset terminal, the system including an ignition system, a motor which drives a fan, a sail switch for indicating air flow, a thermostat, and a motor controller for regulating the speed of the motor in response to a regulate signal from the heat exchange system, the method comprising the steps of:
    starting the motor in a soft start mode upon a first signal from the thermostat and a second signal from the sail switch;
    operating the motor in a regulate mode;
    prepurging the heat exchange system;
    igniting a fuel;
    verifying whether the fuel has been ignited;
    interpurging the system and re-igniting the fuel if the fuel is not ignited.

15. The method of claim 14, wherein the system includes at least one fault detector, and the method further includes the step of: entering a lockout state when a fault condition is detected.

16. The method of claim 14, further comprising the step of: post purging the system when the fuel is extinguished.

* * * * *